(12) United States Patent
Mottet et al.

(10) Patent No.: US 12,738,523 B2
(45) Date of Patent: Sep. 15, 2026

(54) SALINITY GRADIENT POWER GENERATION DEVICE COMPRISING ELECTRODES OF AN ACTIVATED CARBON FABRIC

(71) Applicant: Sweetch Energy, Rennes (FR)

(72) Inventors: Bruno Mottet, Guidel (FR); Benoit Laborie, Rennes (FR); Mohammed Kechadi, Cesson-Sevigne (FR)

(73) Assignee: Sweetch Energy, Rennes (FR)

( * ) Notice: Subject to any disclaimer, the term of this patent is extended or adjusted under 35 U.S.C. 154(b) by 584 days.

(21) Appl. No.: 18/267,685

(22) PCT Filed: Dec. 15, 2021

(86) PCT No.: PCT/FR2021/052330
§ 371 (c)(1),
(2) Date: Jun. 15, 2023

(87) PCT Pub. No.: WO2022/129780
PCT Pub. Date: Jun. 23, 2022

(65) Prior Publication Data

US 2024/0047724 A1 Feb. 8, 2024

(30) Foreign Application Priority Data

Dec. 17, 2020 (FR) ...................................... 2013451

(51) Int. Cl.
*H01M 8/18* (2006.01)
*H01M 4/86* (2006.01)
(Continued)

(52) U.S. Cl.
CPC ......... *H01M 8/188* (2013.01); *H01M 4/8626* (2013.01); *H01M 4/96* (2013.01); *H01M 8/083* (2013.01)

(58) Field of Classification Search
CPC ...... H01M 8/188; H01M 4/8626; H01M 4/96; H01M 8/083; H01M 8/24; H01M 8/18; Y02E 60/50
See application file for complete search history.

(56) References Cited

U.S. PATENT DOCUMENTS

2002/0167782 A1* 11/2002 Andelman ............. C02F 1/008 361/302
2013/0306482 A1* 11/2013 Yang ...................... B01D 61/44 204/632
2019/0326067 A1* 10/2019 Doyen ................... H01G 11/86

FOREIGN PATENT DOCUMENTS

CN 105428089 A 3/2016
JP 2011167643 A * 9/2011
(Continued)

OTHER PUBLICATIONS

Jun. 3, 2025 (JP) Office Action Application No. 2023-537168.
(Continued)

*Primary Examiner* — Muhammad S Siddiquee
(74) *Attorney, Agent, or Firm* — Banner & Witcoff, Ltd.

(57) ABSTRACT

The invention relates to a device for generating electrical power comprising a first electrode having a porosity that allows the flow of an electrolyte solution of concentration $C_A$ in a solute; a second electrode having a porosity that allows the flow of an electrolyte solution of concentration $C_B$ in a solute, $C_B$ being greater than $C_A$; a membrane having selective permeability to anions or cations, said membrane being disposed between the two electrodes and comprising at least one channel arranged to allow the diffusion of electrolytes from the electrolyte solution of concentration $C_B$ to the electrolyte solution of concentration $C_A$ through said channel or channels; and a device making it possible to harvest the electrical power generated by the differential in potential between the two electrodes, wherein the two elec-
(Continued)

trodes are formed of an activated carbon fabric, and to a method for producing electrical power using such a device.

14 Claims, 2 Drawing Sheets

(51) Int. Cl.
*H01M 4/96* (2006.01)
*H01M 8/083* (2016.01)

(56) References Cited

FOREIGN PATENT DOCUMENTS

| | | | | | |
|---|---|---|---|---|---|
| JP | 2014504549 | A | * | 2/2014 | ............ B01D 61/52 |
| KR | 20190061332 | A | | 6/2019 | |
| WO | WO-2012102835 | A1 | * | 8/2012 | ............ B01D 61/52 |
| WO | 2014060690 | A1 | | 4/2014 | |
| WO | 2017037213 | A1 | | 3/2017 | |

OTHER PUBLICATIONS

Kim et al., Power generation from concentration gradient by reverse electrodialysis in ion-selective nanochannels; Microfluid. Nanofluid, 2010, 9, 1215-1224.

* cited by examiner

SALINITY GRADIENT POWER GENERATION DEVICE COMPRISING ELECTRODES OF AN ACTIVATED CARBON FABRIC

RELATED APPLICATIONS

This application is a National Stage Application under 35 U.S.C. 371 of co-pending PCT application PCT/FR2021/052330 designating the United States and filed Dec. 15, 2021; which claims the benefit of FR Application Number 2013451 and filed Dec. 17, 2020, each of which are hereby incorporated by reference in their entireties.

STATE OF THE ART

Salinity gradient power generation is one of the renewable energy sources with the highest global potential.

The reverse electrodialysis (RED) method is, among the various technologies currently being considered, based on the conversion of mixing energy into electrical energy. This technology uses membranes selectively permeable to anions (anionic membranes) or cations (cationic membranes), whose basic property is the selective transport of ions according to the sign of their charge.

A common type of RED device consists of membranes stacked between a pair of electrodes. The membrane stack consists of alternating anionic and cationic membranes between which salt water and freshwater are alternately circulated. The intermembrane spaces, i.e., the spaces in which the fluids circulate, are maintained by placing spacers between the membranes. The circulation of alternating salt and fresh water between these membranes, i.e., the establishment of a salinity gradient on either side of each of these membranes, leads to selective ionic flows through each membrane. For example, sodium ions flow through the cationic membranes towards the cathode and chlorine ions flow through the anionic membranes towards the anode, creating an electrochemical potential difference between the two sides of each membrane, commonly referred to as the membrane potential difference. At the ends, electrode systems convert the ionic current into electrical current and an external electrical circuit ensures the transfer of electrons from the anode to the cathode. The resultant difference in membrane potentials thus generates an electrical current that can be used by a device placed on the circuit connecting the electrodes.

One of the problems with salinity gradient power generation devices, such as the existing RED devices, is that they have a low power generation capacity.

This low energy generation capacity is notably due to the fact that current membranes develop electrical powers per unit area of membrane (i.e., membrane powers) of only a few W/m$^2$ of membrane.

One approach proposed to solve this problem was to develop new membranes.

An example of this approach is outlined in the international application published on Apr. 24, 2014 under WO 2014/060690. In this document, it is proposed to use nanoporous membranes whose inner pore surface is coated with boron nitride or more generally with mixtures of boron, carbon and nitrogen elements. These nanoporous membranes exploit diffusio-osmosis phenomena within the pores and develop membrane powers of the order of kW/m$^2$.

More recently, the Applicant has proposed in the international application published on Mar. 9, 2017 under WO 2017/037213 nanoporous membranes with the inner surface of the pores coated with titanium oxide, allowing to reach membrane powers of the order of 5 kW/m$^2$.

However, this approach implies the use of membranes whose preparation can be complex and expensive due to the materials required.

The low energy generation capacity of these types of RED devices is also due to the resistance of different elements of the system to ionic flow.

This resistance depends mainly on the membrane resistance, the ionic conductivity of the water and the intermembrane distance. In particular, maintaining a spacing of several hundred micrometers between membranes is necessary to allow fluid flow within the membrane stack but contributes significantly to the overall resistance of the system.

In view of the above, there is still a need to improve the electrical power generated by devices for generating electrical energy from a concentration gradient.

DISCLOSURE OF THE INVENTION

The purpose of the present invention is to overcome the drawbacks of the prior art and to provide a power generation device that allows for significant power generation.

Another purpose of the invention is to provide a method of generating electrical power using the device of the invention.

These purposes are achieved by the invention to be described below.

Device

A first object of the invention is a device for generating electrical power comprising:

a) a first electrode (40A) having a porosity allowing the flow of an electrolyte solution (20A) of concentration $C_A$ of a solute;

b) a second electrode (40B) having a porosity allowing the flow of an electrolyte solution (20B) of concentration $C_B$ of a solute, $C_B$ being greater than $C_A$;

c) a membrane (50) selectively permeable to anions or cations, said membrane being disposed between the two electrodes and comprising at least one channel arranged to allow diffusion of electrolytes from the electrolyte solution of concentration $C_B$ to the electrolyte solution of concentration $C_A$ through said channel or channels; and d) a device (80) for collecting the electrical energy generated by the potential differential existing between the two electrodes, wherein the two electrodes (40A, 40B) are formed by an activated carbon fabric.

The difference in concentrations $C_A$ and $C_B$ of the same solute causes the mobility of the electrolytes from the more concentrated solution to the less concentrated solution through the membrane porosity.

In the device of the present invention, the porosity of the activated carbon fabric of the electrodes allows the flow of fluids. Unlike the RED devices of the prior art, the device of the present invention does not therefore require intermembrane space to allow for the flow of fluids.

One effect of this configuration is that the ions passing through the membrane from the electrolyte solution of concentration $C_B$ to the electrolyte solution of concentration $C_A$ and towards the electrode no longer have to pass through an intermembrane space of several hundred micrometers in thickness of an electrolyte solution of low solute concentration $C_A$, having a low conductivity and therefore a high resistance to this ion movement.

Advantageously, the membrane is arranged between the first electrode and the second electrode such that the space between the membrane and each electrode is less than 10 μm, preferably less than 5 μm, more preferably less than 1 μm.

Advantageously, at least one of the first electrode and the second electrode is in contact with the membrane, preferably both electrodes are in contact with the membrane. Thus, advantageously, the device does not include spacer(s).

Electrodes

The two electrodes are made of an activated carbon fabric.

Advantageously, both electrodes are formed from the same activated carbon fabric.

For the purposes of the present invention, "activated carbon fabric" means a sheet of a woven or non-woven fabric of activated carbon fibers.

A woven fabric is an essentially planar assembly of fibers that are parallel to each other (called warp fibers) with weft fibers passing through them, said fibers preferably being interwoven.

A nonwoven fabric is a substantially planar assembly of fibers having a nominal level of structural integrity imparted by physical and/or chemical methods, excluding weaving. In this sense, the nonwoven fabric of the invention meets the definition according to the ISO 9092 standard of April 2019 of a nonwoven fabric.

The non-woven activated carbon fabric of the invention may, for example, be an activated carbon felt.

In a particular embodiment, the activated carbon felt is obtained by needling activated carbon fibers.

Advantageously, the activated carbon fabric has a thickness of less than 5000 μm, preferably a thickness of between 100 and 5000 μm, more preferably between 100 and 2000 μm, even more preferably between 400 and 700 μm, and most preferably between 400 and 600 μm.

In the present invention, the specific surface area of the fabric is measured by the B.E.T. method according to the ISO 9277 standard of September 2010.

Advantageously, the activated carbon fabric has a specific $S_{BET}$ surface area of at least 500 $m^2/g$, preferably of at least 1000 $m^2/g$, more preferably of at least 1500 $m^2/g$. According to an embodiment, the specific $S_{BET}$ surface area of the fabric of the invention is between 500 and 3000 $m^2/g$, preferably between 1000 and 3000 $m^2/g$, more preferably between 1500 and 2500 $m^2/g$.

The activated carbon fabric of the invention is a porous material. It may have a porosity of at least about 50% and preferably at least about 60%.

In the present invention, porosity is defined as the ratio between the pore volume V pores of a sample and the total volume occupied by the sample $V_E$: $P=V_{pores}V_E$. Pore volume is determined indirectly by differential weighing of an impregnated sample and an unimpregnated fabric with a wetting liquid of known density, such as an alcohol.

Specifically, $V_E$ can be measured by the following method:

a) providing a mass sample $m_E$;

b) impregnating the sample of step a) with a liquid of density ρL;

c) determining the mass $m_{E}$, of the impregnated sample of step b);

d) calculating $V_E$ according to the formula $V_E=(m_{Ei}-m_E)/\rho L$.

In one embodiment of the present invention, the activated carbon fabric has a density ranging from 0.05 to 0.20 $g/cm^3$. In the invention, the density of the activated carbon fabric is defined as the ratio between the mass of a sample $m_E$ and its volume $V_E$: $d=m_E/V_E$. The volume $V_E$ can be determined as the product of the surface area of the sample by its thickness.

In the invention, the term "activated carbon fibers" refers to fibers obtained by carbonization and/or graphitization of a carbonaceous precursor and then activation of the carbonized and/or graphitized fibers.

Advantageously, the carbonaceous precursor is polymeric, preferably a carbonaceous precursor selected from phenol-aldehyde, polyacrylonitrile (PAN), rayon, pitch, lignin, or a mixture thereof.

Phenol-aldehyde, polyacrylonitrile (PAN), and rayon and mixtures thereof are preferred. Carbonization and/or graphitization techniques are well known to the skilled in the art. For the purposes of the invention, the term "carbonization" refers to a treatment aimed at calcining fibers of a carbonaceous precursor, for example at a temperature of about 450° C. to 1500° C., preferably in the presence of an inert gas such as nitrogen, argon or helium. The fibers thus treated are referred to here as carbonized fibers. This carbonization treatment results in the removal of most of the non-carbon atoms of the precursor (in particular hydrogen and nitrogen atoms).

In the context of the invention, the term "graphitization" refers to a treatment aimed at calcining a carbonaceous precursor, for example at a temperature of about 1500° C. to 3000° C., the said precursor having possibly been subjected to a carbonization treatment. Although the fibers thus treated do not necessarily have the crystalline structure of graphite, they are referred to here as graphitized fibers.

Thus, in a particular embodiment of the invention, the activated carbon fibers are prepared by carbonization followed by graphitization.

Advantageously, the carbonaceous precursor fibers may have been subjected to an oxidation treatment prior to their carbonization and/or graphitization.

In the context of the invention, the term "oxidation" refers to a treatment aimed at oxidizing a carbonaceous precursor, for example at a temperature of between 100° C. and 400° C.

Activation steps of an activated carbon fabric are also known to the skilled in the art.

In the context of the invention, the term "activation" refers to a treatment of carbonized and/or graphitized fibers to modulate its properties, in particular its porosity and/or adsorption properties. The activation treatment can be physical and/or chemical.

The physical activation may, for example, consist of calcination at a temperature of about 400 to 1500° C. in the presence of gases reactive with the carbon of the carbonized and/or graphitized fibers, such as carbon dioxide, water or oxygen. The physical activation can for example be carried out in a stream of air and water vapor.

Chemical activation may involve contacting the fibers with an activating agent, such as an acid like phosphoric acid or a base like potassium hydroxide, preferably at temperatures between 300° C. and 800° C. When the carbon is chemically activated, the activating agent can be rinsed off and recycled.

Typically, the preparation of activated carbon fibers includes:

$i_0$) an optional step of oxidizing the fibers of a carbonaceous precursor, typically by subjecting the fibers to a temperature between 200 and 300° C. in air for 1 to 2 hours;

i) a step of carbonizing the fibers obtained at the end of step i), typically by subjecting the fibers to a temperature between 700 and 1500° C. for example during 2 to minutes, possibly under an atmosphere of an inert gas such as nitrogen;

ii) an optional step of graphitizing the fibers obtained after step ii), typically by subjecting the fibers to a temperature between 2000 and 3000° C. for example during one minute;

ii) a step of physical or chemical activation of the carbon fibers obtained at the end of step i) or step ii).

Advantageously, the activated carbon fibers consist essentially of carbon, i.e., they preferably consist of at least 80 mol % carbon, preferably at least 90 mol % carbon, more preferably at least 95 mol % carbon, the remainder being elements such as oxygen, nitrogen and hydrogen.

Advantageously, the activated carbon fibers comprise from 80 to 100% by weight of carbon, from 0 to 10% by weight of nitrogen, from 0 to 10% of oxygen and from 0 to 5% by weight of hydrogen.

The fibers of the activated carbon fabric advantageously have a diameter between 1 and 20 μm, preferably between 1 and 15 μm, more preferably between 5 and 12 μm.

In the device of the invention, the activated carbon fabric sheets act as electrodes converting the difference of potential produced by the membrane, otherwise known as the membrane d.o.p., into an electrical current due to their ability to adsorb ions and conduct electricity.

When the activated carbon electrodes only play this role, they are called capacitive electrodes.

In a particular embodiment of the invention, the activated carbon fabric has a selective reactivity to anions or cations, for example to chlorine or sodium.

In this embodiment, the electrodes formed of activated carbon fabric not only act as capacitive electrodes, but are also capable of producing an electrode d.o.p., independent and distinct from the membrane d.o.p.

Indeed, the inventors have discovered that, unexpectedly, certain activated carbon fabrics are capable of producing an electrode d.o.p. independent and distinct from the membrane d.o.p. when used to form the two electrodes of the device of the invention. More specifically, the inventors have shown that when the electrodes are formed from an activated carbon fabric having selective reactivity to anions or cations, for example to chlorine or sodium, they are capable of producing an electrode d.o.p.

By using the term "selective reactivity to anions or cations" or equivalently the term "anion or cation selective reactivity" it is meant that the activated carbon fabric interacts specifically with the ions according to the sign of their charge.

This selective reactivity of the activated carbon fabric towards anions or cations corresponds preferably to a selective adsorption of ions according to the sign of their charge. This adsorption results from surface phenomena between the activated carbon fabric and the ions, and can be a physical adsorption (physisorption), involving weak bonds and not involving any chemical modification of the activated carbon fabric or of the adsorbed ions, and/or a chemical adsorption (chemisorption), i.e. the result of a reversible redox type chemical reaction between the ions and the activated carbon fabric involving, for example, the formation of a chemical bond between the latter, e.g., an ionic bond.

In a particular embodiment, the activated carbon fabric exhibits selective adsorption to anions or cations.

Without wishing to be bound by any particular theory, the inventors consider that the selective reactivity of the activated carbon fabric used to form the electrodes enables the latter to selectively capture ions according to the sign of their charge, in particular according to the surface charge of these fabrics or the redox reactivity of their surface groups, and thus to produce a potential difference between the electrodes that is distinct and independent of the membrane d.o.p. The electrodes thus formed on the basis of activated carbon fabrics with ion-selective reactivity are not purely capacitive electrodes: they can be called pseudo-capacitive electrodes.

According to the inventors, this selective reactivity of activated carbon fabrics is due to their surface chemistry, which results from their preparation method, and in particular from the type of precursor and the activation method used.

Thus, an activated carbon with selective reactivity to anions is an activated carbon characterized as basic.

The basic character of activated carbon can be associated with a delocalization of the electrons η located in the basal planes. The basicity can also be associated with the presence of basic groups on the surface of the activated carbon such as pyrone, chromene, ketone, pyrrole, pyridine, pyridinium, pyridone, pyridine-N-oxide, nitro, nitroso and cyano groups.

According to this embodiment, as illustrated in Example 1, an electrode formed of an activated carbon having selective reactivity to anions is also the site of a redox reaction with said anions.

An activated carbon having a selective reactivity to cations is an activated carbon characterized as acidic, i.e., carrying acidic groups on its surface.

The acidic groups present on the surface of the acidic activated carbon can be the following groups: carboxylic acid, phenol, carbonyl, anhydride, ether, quinone, lactol or lactone.

According to this embodiment, as illustrated in Example 1, an electrode formed of an activated carbon having selective reactivity to cations is also the site of a redox reaction with said cations.

An activated carbon can of course carry both acidic and basic groups. Depending on the relative concentration of acidic and basic groups, the activated carbon can be characterized as acidic (when the acidic character prevails over the basic character) or conversely as basic (when the basic character prevails over the acidic character).

For the purposes of the invention, "electrode d.o.p." means the d.o.p. produced by the electrodes when they are formed from an activated carbon fabric exhibiting selective reactivity to anions or cations.

The inventors have also shown that the direction of the electrode d.o.p. depends on the reactivity selectivity of the activated carbon fabric, and that depending on the permeability selectivity of the membrane, the membrane d.o.p. and the electrode d.o.p. can cumulate or subtract from each other.

In particular, the electrode d.o.p. and the membrane d.o.p. are in the same direction and are cumulative when the reactivity of the activated carbon fabric and the permeability of the membrane are of opposite selectivity, i.e., when the activated carbon fabric has an anion-selective reactivity while the membrane has a cation-selective permeability, or conversely, when the activated carbon fabric has a cation-selective reactivity while the membrane has an anion-selective permeability.

Thus, in a particular embodiment of the invention,

- when the membrane has anion-selective permeability, the electrodes are formed of an activated carbon fabric having cation-selective reactivity, and
- when the membrane has cation-selective permeability, the electrodes are formed of an activated carbon fabric having anion-selective reactivity.

This latter embodiment of the invention is particularly advantageous, in that, as detailed in Kim, et al. 2010. Microfluid. Nanofluid. 9, 1215-1224, the maximum electrical power generated by a reverse electrolysis device such as that of the invention can be estimated according to the formula: $P_{max}=V^2/4R$, where V is the potential difference existing between the electrodes and R is the device resistance.

Thus, when the electrode d.o.p. and the membrane d.o.p. add up, the maximum electrical power generated is $P_{max}=(\text{d.o.p.}_{of\ membrane}+\text{d.o.p.}_{of\ electrode})^2/4R$, which means that the electrode d.o.p. participates in the maximum electrical power of the device of the invention to the extent of the square of the d.o.p. of electrodes, and that the use of activated carbon fabrics with ion-selective reactivity therefore increases the $P_{max}$ of the device of the invention considerably.

In the invention, the anion or cation selective reactivity of an activated carbon fabric can be determined by evaluating the acidic or basic character of the activated carbon fabric. Thus, any method for determining the acidic and/or basic groups on the surface of the activated carbon fabric can be used. Examples of these techniques are: acid-base assays, Boehm's method, determination of the pH of zero-point-of-charge, Fourier transform infrared (FTIR), X-ray photon spectroscopy (XPS) and determination of the pKa distribution.

Preferably, the anion or cation selective reactivity of an activated carbon fabric can also be determined as follows:

i) preparing a device comprising:
   - ia) a first electrode in the form of an activated carbon fabric having a porosity allowing the flow of an electrolyte solution of concentration $C_A$ of a solute,
   - ib) a second electrode in the form of an activated carbon fabric having a porosity allowing the flow of an electrolyte solution of concentration $C_B$ of a solute, $C_B$ being greater than $C_A$,
   - ic) a membrane permeable to ions regardless of the sign of their charge, said membrane being disposed between the two electrodes, said membrane comprising at least one channel arranged to allow the diffusion of ions from the electrolyte solution of concentration $C_B$ to the electrolyte solution of concentration $C_A$ through said channel or channels, and
   - id) a voltmeter whose negative terminal is connected to the second electrode and the positive terminal is connected to the first electrode;

ii) circulating an electrolyte solution of concentration $C_A$ of a solute in the first electrode and an electrolyte solution of concentration $C_B$ of a solute in the second electrode, $C_B$ being greater than $C_A$;

iii) measuring the potential difference between the electrodes with the voltmeter and determining the selectivity of the activated carbon fabric as follows:

when a positive potential difference is measured, said fabric is selectively reactive to anions when a negative potential difference is measured, said fabric is selectively reactive to cations.

Membrane

In the context of the present invention, "membrane" means a material in the form of a sheet that is permeable to at least some of the ions in the electrolyte solution. The expression "selective permeability to anions or cations" means that the membrane allows the majority of anions or cations to pass through it, and inhibits or strongly delays the passage of ions of opposite charge.

Advantageously, the membrane is also permeable to the solvent of the electrolyte solution, preferably water.

It is known that in reverse electrolysis devices, the presence of an ion concentration gradient on either side of a membrane having a selective permeability to ions gives rise to an electrochemical potential difference between the two sides of the membrane.

In the invention, this potential difference is referred to as the "membrane potential difference", abbreviated as "membrane d.o.p.".

Any type of membrane selectively permeable to anions or cations is compatible with the invention.

The anion- or cation-selective permeable membrane may be in the form of a homogeneous layer of one material or a stack of several layers formed of different materials.

Advantageously, the anion- or cation-selective permeable membrane of the invention is an ion-exchange membrane, i.e., a membrane formed of at least one inorganic or organic material carrying ionogenic groups, also called ion-exchange groups, which give the membrane its ion-selective permeability property. In the sense of the invention, an ionogenic group is a chemical group which, when placed in a liquid, has the ability to release an ion, called counter ion, and to bind an ion of the same charge contained in this liquid.

In one embodiment, the membrane comprises an organic polymer bearing ionogenic groups, commonly referred to as an ion exchange resin. The membrane of the invention may thus be formed from a matrix of an insoluble polymer in which an ion exchange resin has been included, or a matrix of an insoluble polymer to which ionogenic groups have been grafted.

In one embodiment, the insoluble polymer is typically a hydrocarbon matrix advantageously selected from a polyoside matrix such as a cellulose or dextran matrix, a polystyrene matrix, a polytetrafluoroethylene matrix, or a matrix of a copolymer such as a styrene and divinylbenzene copolymer.

In one embodiment, the cation-selective permeable membrane comprises cation exchange groups advantageously selected from the epoxide group, the hydroxyl group, the carbonyl group, the carboxyl group, the sulfonate group $—SO_3^-$, the carboxyalkylate group $R—CO_2^-$ with R being a C1-C4 alkyl and preferably C1 alkyl, the aminodiacetate group $—N(CH_2CO_2^-)_2$, the phosphonate group $PO_3^{2-}$; the amidoxine group $—C(=NH_2)(NOH)$, the aminophosphonate group $—CH_2—NH—CH_2—PO_3^{2-}$, the thiol group —SH, and mixtures thereof.

In one embodiment, the anion-selective permeable membrane comprises cation exchange groups advantageously selected from the quaternary ammonium group $—N(R)_3^+$ with R being a C1-C4 alkyl, the tertiary ammonium group $—N(H)R)_2^+$ with R being a C1-C4 alkyl, preferably a C1 alkyl, the dimethylhydroxyethylammonium group $—N(C_2H_4OH)CH_3)_2^+$, and mixtures thereof.

Advantageously, the thickness of the membrane is between 2 μm and 100 μm, preferably between 2 μm and 75 μm.

The thickness of the membrane is advantageously at least 2.5 μm, and is preferably between 2.5 μm and 100 μm, more preferably between 2.5 μm and 100 μm.

Advantageously, the total thickness of the first electrode (40A), the membrane (50) and the second electrode (40B) is greater than 150 μm, preferably greater than 200 μm. This total thickness is for example between 200 and 10,000 μm, preferably is between 1000 and 10,000 μm, more preferably is between 2000 and 10,000 μm.

Advantageously, the membrane comprises channels that connect the two sides of the membrane. The channels may extend through the membrane or form a channel network to ensure the flow of ions and/or solvent between the two sides of the membrane.

The channels of the membrane of the invention advantageously have an average diameter of 1 to 500 nm, preferably of 1 to 100 nm, more preferably of 2 to 100 nm, more preferably of 10 to 100 nm.

In a particular embodiment of the invention, the membrane has a density of channels per unit area of membrane greater than $10^5$ channels per $cm^2$ of membrane, preferably greater than $10^8$ channels per $cm^2$ of membrane.

The membrane channels of the invention may have any type of morphology, for example a tubular, asymmetric cone-like, or neck morphology.

In a particular embodiment, at least a portion of the inner surface of the membrane channels is coated with boron nitride, a compound based on carbon, boron and nitrogen, or a titanium oxide, preferably titanium dioxide.

These coatings have the effect of increasing the surface charge of the inner surface of the channels and significantly improving the electrical power generated by devices comprising such high surface charge density nanofluidic membranes, as detailed in international applications WO 2014/0606902017 and WO 2017/037213. In this embodiment, the membranes advantageously have channels with an average diameter between 2 and 100 nm. In one embodiment, the membrane of the invention is self-supporting. For the purposes of the present invention, a "self-supporting membrane" is defined as a membrane that does not require to be supported by one or more rigid (e.g., sheets of a porous solid material) or deformable (e.g., sheets of a polymeric material) supports to ensure its mechanical integrity.

In a particular embodiment, the present invention excludes the following embodiment:

- elements (a) and (b) are made of activated carbon;
- element (c) is formed of a material comprising lamellar nanoparticles, preferably lamellar nanoparticles of a metal oxide, a dichalcogenide of a transition metal such as molybdenum disulfide, carbon, or a mixture thereof, further preferably lamellar nanoparticles of graphene oxide;
- elements (a) and (b) are on either side of element (c) without any space between (a) and (c) and between (b) and (c).

Preferably, particularly excluded from the invention is that particular embodiment in which all of elements (a), (b) and (c) have a thickness of 4 μm to 100 μm.

Preferably, particularly excluded from the invention is that particular embodiment in which element (c) is formed of a material having pores with a diameter between 1 and 100 nm.

Other Components of the Device

When an electrolyte solution of concentration $C_A$ of a solute is circulated in the porosity of the first electrode (40A) and an electrolyte solution of concentration $C_B$ is circulated in the porosity of the second electrode (40B), $C_B$ being higher than $C_A$, a concentration gradient appears between the two faces of the membrane (50).

This concentration gradient causes an osmotic ion flow between the two electrodes.

In a particular embodiment, the concentration gradient can be achieved and/or modulated via a temperature gradient between the two electrolyte solutions, which influences the solubility of the salt as a function of temperature.

In the context of the present invention, the concentration ratio Rc refers to the ratio of the concentration of the more concentrated solution to the concentration of the less concentrated solution, i.e., the ratio $C_B/C_A$.

Preferably, the concentration ratio $C_B/C_A$ is greater than 1 and less than or equal to $10^9$, advantageously greater than 10 and less than or equal to $10^5$.

The concentration ratio $C_B/C_A$ is for example between 1 and 1000, preferably between 1 and 100, more preferably between 2 and 100.

Electrolyte solutions are aqueous solutions containing electrolytes. The electrolytes can be of any chemical nature as long as they dissolve in the solution in the form of ions. Preferably, these ions come from dissolved salts such as LiCl, NaCl, KCl, $CaCl_2$ and $MgCl_2$. The electrolyte solutions can be:

- synthetic solutions;
- natural solutions, such as fresh water from lakes or rivers, groundwater, brackish water, seawater;
- industrial production water, oil production water or biological solutions.

The solutions advantageously come from tanks 10A and 10B, each tank being any device or natural environment, open or closed, that can contain a liquid.

The electrodes formed of a carbon fabric are connected together to a device (80) allowing to collect, i.e., to circulate and to capture the electrical energy spontaneously generated by the potential differential existing between them. This device (80) forms an external electrical circuit advantageously comprising an electrical cable, a battery, a bulb or any other form of electrical consumer.

The activated carbon fabric of the first and second electrode are advantageously each in contact with a current collector (60A, 60B), which are connected to the device (80). The current collector is made of a material with a very good electrical conductivity, such as a carbon or metal-based material.

Advantageously, the device comprises means for switching the flow of the electrolyte solutions of concentration $C_A$ and $C_B$, which are designed in such a way that the device can be switched between a mode in which the electrolyte solution of concentration $C_A$ in a solute flows into the first electrode and the electrolyte solution of concentration $C_B$ in a solute with $C_B$ greater than $C_A$, flows into the second electrode, and a mode in which the electrolyte solution of concentration $C_A$ of a solute flows into the second electrode and the electrolyte solution of concentration $C_B$ of a solute, $C_B$ being greater than $C_A$, flows into the first electrode.

In a particular embodiment of the invention, the device may comprise N−1 membranes (50) arranged between N electrodes (40), N being an integer, in particular between 3 and 1000, preferably between 3 and 250, for example between 3 and 100.

In this embodiment of the device, the electrodes and membranes are as defined above, and the device may also have N current collectors (60) and advantageously N−1 devices (80) for circulating and collecting electrical energy, said devices (80) being preferably connected to each other in series. In this embodiment, the device thus consists of alternating electrodes in which a concentrated electrolyte solution and a less concentrated electrolyte solution are alternately circulated, separated by membranes.

Method of Generating Electrical Energy

A second object of the invention relates to a method of generating electrical power using a device according to the first object of the invention comprising the following steps:

i) supplying the first electrode (40A) with an electrolyte solution (20A) of solute concentration $C_A$, so that said solution circulates within the first electrode;

ii) supplying the second electrode (40B) with an electrolyte solution (20B) of concentration $C_B$ of the same solute, $C_B$ being greater than $C_A$, so that said solution circulates within the second electrode;

iii) allowing electrolytes to diffuse from the first electrode to the second electrode through the membrane (50);

iv) capturing the electrical energy generated by the potential differential existing between the two electrodes, using the device (80).

Steps i) and ii) are preferably implemented by supplying the electrolyte solution of concentration $C_A$ and the electrolyte solution of concentration $C_B$ as a continuous flow. Advantageously, the method further comprises a step $v_1$) of switching the supply of the electrolyte solutions of concentration $C_A$ and $C_B$, so that the electrolyte solution of concentration $C_A$ of a solute flows into the second electrode and the electrolyte solution of concentration $C_B$ of a solute, $C_B$ being greater than $C_A$, flows into the first electrode, and a step $v_2$) of switching the supply again in the opposite direction. The purpose of this switching is to alternately charge and then discharge the reactive surface of the electrodes, thus creating a continuous alternating current.

These various steps will be easily performed by the person skilled in the art, using his general knowledge.

Preferably, said electrolyte solutions are aqueous solutions comprising a solute selected from alkali halides or alkaline earth halides, preferably selected from LiCl, NaCl, KCl, $CaCl_2$ and $MgCl_2$.

Preferably, the solute of the electrolyte solutions is NaCl.

To improve the osmotic flux generated on both sides of the membrane according to the invention the pH of the solutions can be adjusted according to the isoelectric point of the material or materials constituting the membrane.

In the context of the present invention, $pH_{iso}$ means the pH of the isoelectric point of the material or materials constituting the membrane. The $pH_{iso}$ is measured by methods known to the person skilled in the art, in particular by the potentiometric acid/base titration method.

Even more favorably, to increase the asymmetry of the device and amplify the amount of electrical energy generated by the device, a pH gradient can also be established between the two tanks, the pH difference between the two solutions will be greater than 1, preferably greater than 2.

Advantageously, the concentration ratio $C_B/C_A$ is greater than 1 and less than or equal to $10^9$, preferably greater than 1 and less than or equal to $10^5$.

The solutions of concentration $C_A$ and $C_B$ are conducted into inlets of the device 30A and 30B. The electrolyte solutions 20A and 20B flow through the porous first electrode of an activated carbon fabric 40A and the second electrode of an activated carbon fabric 40B, respectively, between which a selectively anion- or cation-permeable membrane (50) is arranged. In the context of the invention, the membrane (50) contains channels that are not shown, allowing the selective diffusion of anions or cations contained in the electrolyte solutions 20A and 20B according to the concentration gradient acting on either side of the membrane (50).

In the illustrated example, the electrolyte solution 10A which enters the porous area of the electrode 20A has a concentration $C_A$ lower than the concentration $C_B$ of the electrolyte solution 10B which enters the porous area of the electrode 20B. Depending on the selectivity of the membrane, anions or cations from the electrolyte solution 20B pass through the membrane to the electrolyte solution 20A.

The two electrodes 40A and 40B are connected to an external electrical circuit allowing an electrical current to flow between the electrodes 40A and 40B via current collectors 60A and 60B, the external electrical circuit comprising a device 80 such as a light bulb, battery or any other electrical consumer capturing the electrical energy generated by the device of the invention.

Figure 2:
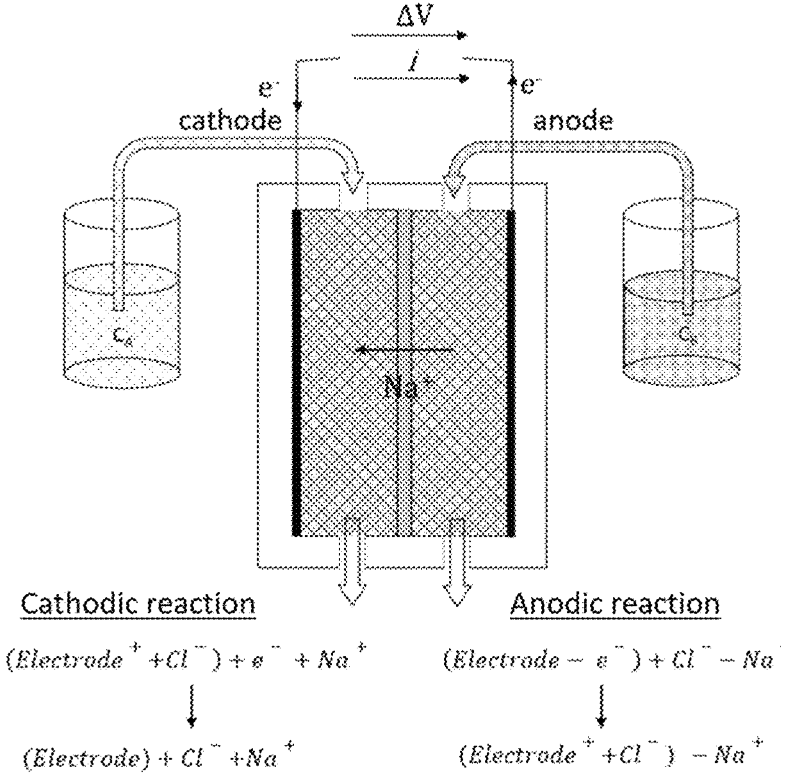

FIG. 2 shows schematically an experimental setup demonstrating the generation of an electrode d.o.p. independent and distinct from the membrane d.o.p. A membrane permeable to ions regardless of the sign of their charge is placed between electrodes made of a single fabric of type A activated carbon, i.e., an activated carbon with selective reactivity to anions. The electrodes are connected by an external electrical circuit comprising a voltmeter, the positive terminal of which is connected to the electrode through which the solution of concentration $C_A$ flows and the negative terminal of which is connected to the electrode through which the solution of concentration $C_B$ flows.

The electrolyte solutions of concentration $C_A$ and $C_B$, $C_B$ being higher than $C_A$, are sodium chloride solutions. The direction of the current and the potential observed can only be explained by a selective reaction of the activated carbon fabric for anions, in this example chlorine.

Figure 3:
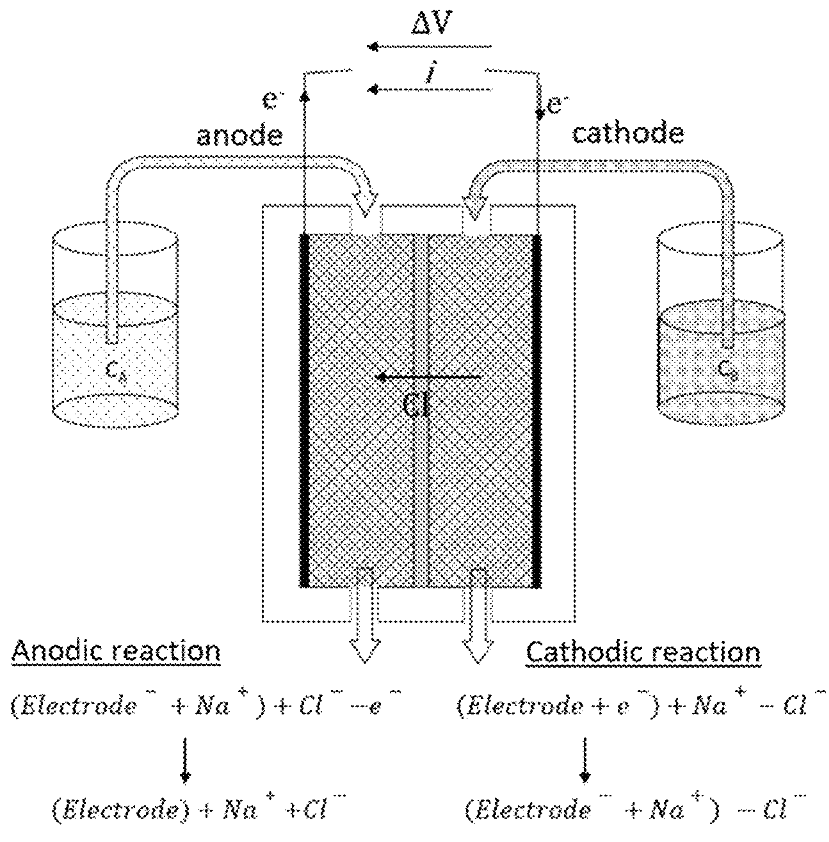

FIG. 3 shows schematically an experimental setup demonstrating the generation of an electrode d.o.p. independent and distinct from the membrane d.o.p. A membrane permeable to ions regardless of the sign of their charge is placed between electrodes made of the same fabric of type B activated carbon, i.e., an activated carbon having a selective reactivity to cations. The electrodes are connected by an external electrical circuit comprising a voltmeter, the positive terminal of which is connected to the electrode through which the solution of concentration $C_A$ flows and the negative terminal of which is connected to the electrode through which the solution of concentration $C_B$ flows. The electrolyte solutions of concentration $C_A$ and $C_B$, $C_B$ being higher than $C_A$, are sodium chloride solutions. The direction of the current and the potential observed can only be explained by a selective reaction of the activated carbon fabric for cations, in this example sodium.

EXAMPLES

The present invention will be better understood upon reading the following examples which illustrate without limitation the invention.

Equipment and Raw Materials

The raw materials used in the examples are listed below:

Membranes:

- Cation exchange membrane marketed by Fumasep under the reference FKS, hereinafter referred to as "MEC";
- Anion exchange membrane marketed by Fumasep under the reference FAS, hereinafter referred to as "MEA";
- Membrane permeable to ions regardless of the sign of their charge (non-selective membrane) of the "Track Etched Membrane" type with approximately $6.10^8$ channels per $cm^2$ of membrane marketed by the company Millipore, hereafter referred to as "MNS".

Electrodes:

- Graphite felt marketed by CETEC under the reference GF 020, hereinafter referred to as "GF";
- Activated carbon fabric marketed by Kynol under the reference ACC 5092 20, hereafter referred to as "A";
- Activated carbon felt marketed by SIGRACELL under the reference GFA5, hereafter referred to as "B";

Solutions

Solutions of concentration $C_A$=0.01 M and $C_B$=1 M of sodium chloride NaCl are prepared.

Example 1: Preparation of Devices D1, D2, D3 and D4 according to the Invention and Comparison with Devices D1, D2', D3', D4', D5' not according to the Invention The tests were carried out with a device comprising two electrodes of a graphite or activated carbon fabric plated on either side of a membrane, with solutions of concentration $C_A$ and $C_B$ of sodium chloride (NaCl) passing through the electrodes respectively.

Depending on the experiment, the electrodes are GF, A or B electrodes separated by a MEC, MEA or MNS membrane.

The electrodes are connected by an external electrical circuit comprising a voltmeter whose positive terminal is connected to the electrode in which the solution of concentration $C_A$ flows and the negative terminal is connected to the electrode in which the solution of concentration $C_B$ flows.

The measurements are performed with a device comprising a membrane with a surface of 5 $cm^2$.

The results are presented in Table 1.

Reading the Results of Devices D1, D2, D3 and D4

On the other hand, the comparison of the results obtained with devices D1, D2, D3 and D4 show that when activated carbon is used for the preparation of the electrodes, the electrical powers generated differ according to the type of activated carbon fabric (A or B) and the selective permeability of the membrane to anions (MEA) or cations (MEC).

In particular, the results show that the highest powers are obtained with devices D1 and D4, i.e., by combining type A activated carbon electrodes (having selective reactivity to anions) with a MEC membrane, or type B activated carbon electrodes (having selective reactivity to cations) with a MEA membrane.

Reading the Results of Devices D3', D4', and D5'

The results obtained with device D3', which includes a non-selective membrane and graphite electrodes show that, as expected in a purely capacitive system, the graphite-based electrodes do not generate any potential difference.

On the contrary, the results obtained with devices D4' and D5' comprising a non-selective membrane and respectively activated carbon electrodes of type A or B show that, surprisingly, activated carbon electrodes can produce a positive or negative potential difference depending on the type of activated carbon used.

Furthermore, the direction of the current and potential observed with device D4' can be explained by a selective reaction of the type A activated carbon fabric electrode with chlorine, the reactions at the cathode and anode can be formalized as follows:

| | $C_A$ | $C_B$ | Membrane | Electrodes | ΔV (mV) | I (mA) | $R_S$ (Ohm · $cm^2$) | Pmax ($W/m^2$) |
|---|---|---|---|---|---|---|---|---|
| $D_1$' | 0.01 | 1 | MEC | GF | 105.00 | 74.00 | 7.095 | 3.89 |
| $D_2$' | 0.01 | 1 | MEA | GF | −103.00 | −72.00 | 7.153 | 3.71 |
| $D_1$ | 0.01 | 1 | MEC | A | 162.00 | 117.00 | 6.923 | 9.48 |
| $D_2$ | 0.01 | 1 | MEA | A | −46.00 | −32.00 | 7.188 | 0.74 |
| $D_3$ | 0.01 | 1 | MEC | B | 32.00 | 22.00 | 7.273 | 0.35 |
| $D_4$ | 0.01 | 1 | MEA | B | −180.00 | −128.00 | 7.031 | 11.52 |
| $D_3$' | 0.01 | 1 | MNS | GF | 0.00 | 0.00 | 0.00 | 0.00 |
| $D_{4'}$ | 0.01 | 1 | MNS | A | 59.00 | 16.00 | 18.438 | 0.47 |
| $D_{5'}$ | 0.01 | 1 | MNS | B | −75.00 | −19.00 | 19.737 | 0.71 |

with:

- $C_A$ and $C_B$ are the concentrations of NaCl expressed in mol/L;
- ΔV the potential measured by the voltmeter when the external circuit is open;
- I the current is measured by an ammeter when the external circuit is closed;
- Rs, the surface resistance of the device is calculated by Ohm's law: $R_s$=U/I.S;
- $P_{max}=V^2/4R$ Reading the Results of Devices D1' and D2'

Table 1 shows that using graphite for electrode preparation, the electrical powers generated by devices D1' and D2' are similar whether the membrane is anionic or cationic. When read in combination with the results of device D3', the results of devices D1' and D2' show that, as expected, the graphite-based electrodes are purely capacitive, with the measured d.o.p.'s corresponding to the d.o.p.'s of the MEC (D1') or MEA (D2') membrane.

Cathodic reaction:

$$(\text{Electrode}^+ + \text{Cl}^-)_{solid} + e^- + \text{Na}^+_{(aq)} \downarrow (\text{Electrode})_{solid} + \text{Cl}^-_{(aq)} + \text{Na}^+_{(aq)}$$

Anodic reaction:

$$(\text{Electrode}-e^-)_{solid} + \text{Cl}^-_{(aq)} - \text{Na}^+_{(aq)} \downarrow (\text{Electrode}^+ + \text{Cl}^-)_{solid} - \text{Na}^+_{(aq)}$$

Similarly, the direction of the current and potential observed with device D5' can be explained by a selective reaction of the activated carbon fabric electrode type B with sodium, the reactions at the anode and cathode can be formalized as follows:

Anodic reaction:

$$(\text{Electrode}^- + \text{Na}^+)_{solid} + \text{Cl}^-_{(aq)} - e^- \downarrow (\text{Electrode})_{solid} + \text{Na}^+_{(aq)} + \text{Cl}^-_{(aq)}$$

Cathodic reaction:

$$(\text{Electrode}+\text{e}^-)_{solid} + \text{Na}^+_{(aq)} - \text{Cl}^-_{(aq)} \downarrow (\text{Electrode}^- + \text{Na}^+)_{solid} - \text{Cl}^-_{(aq)}$$

Example 2: Effect of Fluid Flow Configuration on Total Device Resistance

In this Example, it is shown that circulating fluids through the porous electrodes arranged in contact with the membrane, as in the case of the devices of Example 1, results in devices with lower resistance than that of the RED devices of the prior art, in which the electrolyte solutions are circulated in intermembrane spaces of several hundred micrometers in thickness.

Figure 1:
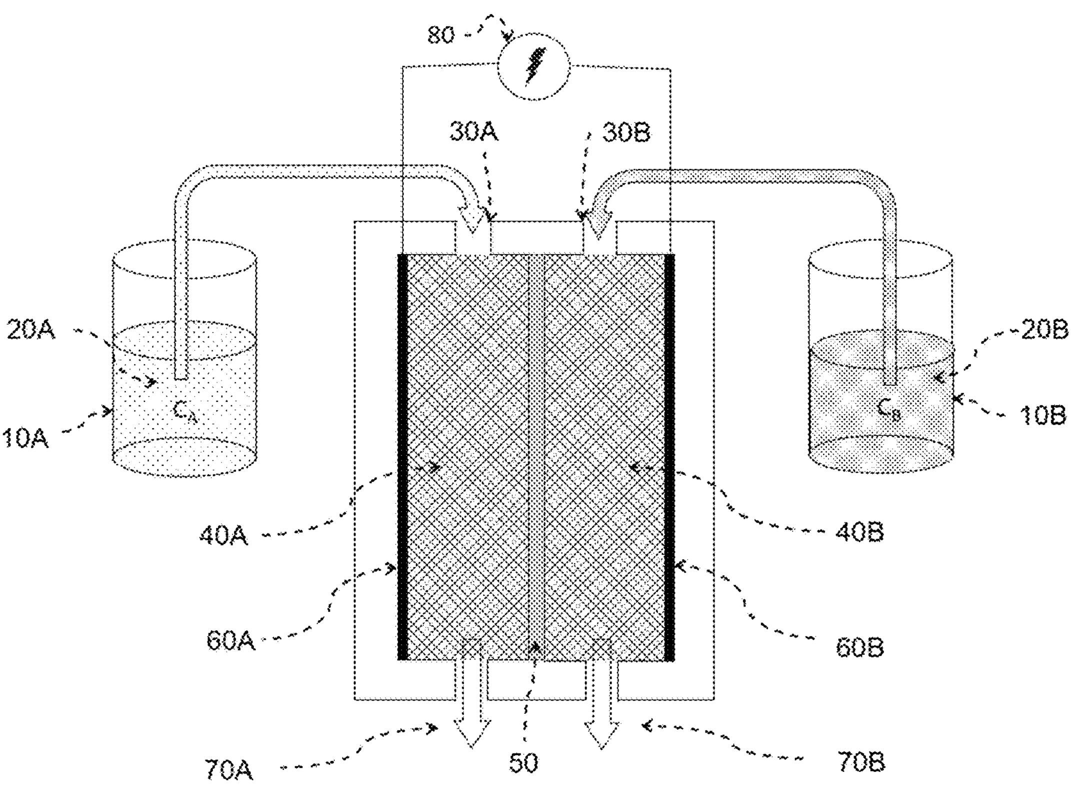
FIG. 1 schematically represents an example of an electrical power generation device according to the present invention, connected to two tanks 10A and 10B. Tank A contains an electrolyte solution of concentration $C_A$ in a solute 20A and tank 10B contains an electrolyte solution $C_B$ in the same solute 20B.

As illustrated in FIG. 1, the device of the invention is configured such that ions passing through the ion-selective membrane from the electrolyte solution of concentration $C_B$ to the electrolyte solution of concentration $C_A$ ($C_B$ being greater than $C_A$) immediately encounter the first electrode through which the electrolyte solution of concentration $C_A$ flows.

In contrast, and as mentioned above, in prior art RED devices, electrolyte solutions flow in intermembrane spaces, and the thickness of these solutions constitute resistances to ion flow, known as Bulk resistances. In particular, electrolyte solutions of low solute concentration have low ionic conductivity and thus high bulk resistance.

The resistance of the prior art RED devices can be modeled as being composed of 5 resistors in series that add up according to the formula:

$$RTotale=Rmelc+RbulkC_A+RM+RbulkC_B+Rmelc$$

with

Rmelc the resistance of the material composing the electrode, $RbulkC_A$ the resistance of the electrolyte solution of concentration $C_A$, RM the membrane resistance, $RbulkC_B$ the resistance of the electrolyte solution of concentration $C_B$, $C_B$ being greater than $C_A$.

Since the collectors are very good conductors, their contribution to the surface resistance of the prior art RED devices is neglected here.

Consider an electrolyte solution comprising 0.01 M of NaCl, which corresponds to an electrolyte solution of concentration $C_A$ of Example 1.

The ionic conductivity $\sigma$ of such a solution is 0.126 S/m.

It is considered that in the prior art RED device, the electrolyte solution comprising M of NaCl flows through an intermembrane space of 2 mm thickness. Such a thickness typically corresponds to that of the GF graphite fabric used in devices D1' and D2' of Example 1.

The conductance G of a portion of solution of surface S and thickness L is given by the formula: $G=\sigma.\ S/L$. Now the resistance R is the inverse of the conductance G, i.e., $R=1/G$, from which it follows that $R.S=L/\sigma$.

Thus, if we consider an electrolyte solution comprising 0.01 M of NaCl flows in a 2 mm thick intermembrane space, we can calculate that for a portion of solution of 1 cm 2 surface area and 2 mm thickness, the resistance is 158 Ohm. In other words, the surface resistance of a 2 mm layer of electrolyte solution comprising 0.01 M of NaCl flows in the intermembrane spaces of the prior art devices is 158 $Ohm.cm^2$.

Thus, the bulk resistance associated with the thickness of an electrolyte solution comprising 0.01 M of NaCl flows through the intermembrane spaces of a prior art RED device alone constitutes a resistance more than 20 times greater than the total surface resistance observed in the devices of Example 1, particularly devices D1' and D2'. Therefore, circulating the fluid through the porosity of the electrodes significantly reduces the resistance of the system.

The invention claimed is:

1. A device for generating electrical energy by reverse electrodialysis (RED) comprising a first electrolyte solution of concentration $C_A$ of an electrolyte, a second electrolyte solution of concentration $C_B$ of the same electrolyte, $C_B$ being greater than $C_A$, and:

a) a first electrode supplied with the first electrolyte solution and having a porosity allowing flow of said first electrolyte solution;

b) a second electrode supplied with the second electrolyte solution and having a porosity allowing the flow of said second electrolyte solution;

c) a membrane selectively permeable to anions or cations, said membrane being disposed between the two electrodes and comprising at least one channel arranged to allow diffusion of electrolytes from the second electrolyte solution to the first electrolyte solution through said channel or channels; and d) a device for collecting the electrical energy generated by the potential differential existing between the two electrodes, wherein the two electrodes are made of an activated carbon fabric and the device does not comprise an external voltage source.

2. The device according to claim 1, wherein the activated carbon fabric has a thickness of less than 5000 μm.

3. The device according to claim 1, wherein the activated carbon fabric has a specific $S_{BET}$ surface area of at least 500 $m^2/g$.

4. The device according to claim 1, wherein the thickness of the membrane is between 2 μm and 100 μm.

5. The device according to claim 1, wherein the activated carbon fabric has a selective reactivity to anions or cations.

6. The device according to claim 5, wherein:

when the membrane has anion-selective permeability, the electrodes are formed of an activated carbon fabric having cation-selective reactivity, and when the membrane has cation-selective permeability, the electrodes are formed of an activated carbon fabric having anion-selective reactivity.

7. The device according to claim 5, wherein the anion or cation selective reactivity of an activated carbon fabric is determined as follows:

i) preparing a device comprising:

ia) a first electrode in the form of an activated carbon fabric having a porosity allowing the flow of an electrolyte solution of concentration $C_A$ of a solute, ib) a second electrode in the form of an activated carbon fabric having a porosity allowing the flow of an electrolyte solution of concentration $C_B$ of a solute, $C_B$ being greater than $C_A$, ic) a membrane permeable to ions regardless of the sign of their charge, said membrane being disposed between the two electrodes, said membrane comprising at least one channel arranged to allow the diffusion of ions from the electrolyte solution of concentration $C_B$ to the electrolyte solution of concentration $C_A$ through said channel or channels, and id) a voltmeter whose negative terminal is connected to the second electrode and the positive terminal is connected to the first electrode;

ii) circulating an electrolyte solution of concentration $C_A$ of a solute in the first electrode and an electrolyte solution of concentration $C_B$ of a solute in the second electrode, $C_B$ being greater than $C_A$;

iii) measuring the potential difference between the electrodes with the voltmeter and determining the selectivity of the activated carbon fabric as follows:

when a positive potential difference is measured, said fabric is selectively reactive to anions, when a negative potential difference is measured, said fabric is selectively reactive to cations.

8. A method of generating electrical power using a device as described in claim 1, comprising the following steps:

i) supplying the first electrode with the first electrolyte solution of solute concentration $C_A$, so that said first electrolyte solution circulates within the first electrode;

ii) supplying the second electrode with the second electrolyte solution of concentration $C_B$ of the same solute, $C_B$ being greater than $C_A$, so that said second electrolyte solution circulates within the second electrode;

iii) allowing electrolytes to diffuse from the first electrode to the second electrode through the membrane;

iv) capturing the electrical energy generated by the potential differential existing between the two electrodes, using the device.

9. The method according to claim 8, wherein said electrolyte solutions are aqueous solutions comprising a solute selected from the group consisting of alkali halides and alkaline earth halides.

10. The method according to claim 8, wherein the concentration ratio $C_B/C_A$ is greater than 1 and less than or equal to 109.

11. The device according to claim 4, wherein the thickness of the membrane is between 2 μm and 75 μm.

12. The method according to claim 9, wherein the solute is selected from the group consisting of LiCl, NaCl, KCl, $CaCl_2$ and $MgCl_2$.

13. The method according to claim 12, wherein the solute is NaCl.

14. The method according to claim 10, wherein the concentration ratio $C_B/C_A$ is greater than 1 and less than or equal to $10^5$.

* * * * *